(12) United States Patent
Doyer et al.

(10) Patent No.: US 8,157,449 B2
(45) Date of Patent: Apr. 17, 2012

(54) BALL BEARING CAGE

(75) Inventors: Armel-Louis Doyer, Savonnieres (FR); Frank Berens, Saunay (FR); Thierry Adane, Tours (FR); Nicolas Baillieul, Cherbourg Octeville (FR); Alexandre Manceau, Saint-Cyr-sur-Loire (FR)

(73) Assignee: Aktiebolaget SKF, Göteborg (SE)

( * ) Notice: Subject to any disclaimer, the term of this patent is extended or adjusted under 35 U.S.C. 154(b) by 506 days.

(21) Appl. No.: 12/227,187

(22) PCT Filed: Apr. 12, 2007

(86) PCT No.: PCT/FR2007/051101
§ 371 (c)(1),
(2), (4) Date: Sep. 18, 2009

(87) PCT Pub. No.: WO2007/135305
PCT Pub. Date: Nov. 29, 2007

(65) Prior Publication Data
US 2010/0046875 A1 Feb. 25, 2010

(30) Foreign Application Priority Data

May 12, 2006 (FR) ..................................... 06 04232

(51) Int. Cl.
*F16C 33/41* (2006.01)
(52) U.S. Cl. ........................................ 384/531; 384/470

(58) Field of Classification Search ................. 384/470, 384/523, 527, 531
See application file for complete search history.

(56) References Cited

U.S. PATENT DOCUMENTS

| | | |
|---|---|---|
| 5,015,105 A | 5/1991 | Ueno |
| 2002/0041719 A1* | 4/2002 | Kawakami ............... 384/470 |
| 2002/0114550 A1* | 8/2002 | Daikuhara ............... 384/470 |
| 2002/0126927 A1* | 9/2002 | Compassi ............... 384/470 |

FOREIGN PATENT DOCUMENTS

| | | |
|---|---|---|
| DE | 37 24 046 A1 | 1/1988 |
| EP | 1 070 866 A | 1/2001 |
| JP | 11 210757 A | 8/1999 |
| JP | 2002 139049 A | 5/2002 |
| JP | 2002 147463 A | 5/2002 |
| JP | 2003 329045 A | 11/2003 |

* cited by examiner

*Primary Examiner* — Thomas R Hannon
(74) *Attorney, Agent, or Firm* — Mark Ussai; Bryan Peckjian

(57) ABSTRACT

Cage 4 for a ball bearing, comprising an annular heel 7 and a substantially axial portion 8 provided with claws 11 defining pockets 9 for balls and connected to the heel 7, the substantially axial portion 8 extending axially over a part of the pockets 9. The substantially axial portion 8 has an outside diameter smaller than the outside diameter of the heel 7, the outside diameter of the substantially axial portion being somewhere between the pitch circle diameter of the cage reduced by half the radial thickness of the heel and the pitch circle diameter of the cage increased by half the radial thickness of the heel.

18 Claims, 5 Drawing Sheets

BALL BEARING CAGE

BACKGROUND OF THE INVENTION

The present invention relates to the field of rolling bearing cages, particularly synthetic cages used in deep-groove ball bearings to provide a suitable circumferential spacing between the balls. The invention also relates to cages for rolling bearings the rings of which are made of thin sheet.

Cages of these types are of annular overall shape with spherical pockets in which the balls are partially housed. The balls are held in the pockets by claws arranged in pairs on the opposite side to the heel of the cage. The spherical pockets have a diameter very slightly greater than that of the balls so that there remains a certain functional clearance between the balls and the pockets. Reference may be made to the abstract of document JP 2002/147 463 (NSK), in which the radial thickness of the claws tapers away from the heel.

When the rolling bearing is running at high speed, centrifugal force subjects the cage to stresses which have a tendency to deform said cage, mainly in the radial direction, and cause it to mushroom, that is to say which give the cage a conical shape by increasing the diameter on the claw side. Deformation such as this has a detrimental effect on the correct operation of the rolling bearing because the edges of the pockets become clamped against the balls, increasing the frictional torque and scraping the lubricant, all this soon leading to accelerated degrading of the lubrication of the bearing. There is also a risk that the ends of the claws will come into contact with the bore of the outer ring of the bearing, with the risk of causing excessive cage wear.

SUMMARY OF THE INVENTION

It is an object of the present invention to remedy these disadvantages.

It is an object of the present invention to reduce radial deformation of the opposite end of the cage to the heel while at the same time making said cage lighter.

The cage for a ball bearing comprises an annular heel and a substantially axial portion provided with claws defining pockets for balls and connected to the heel. The substantially axial portion extends axially over a length greater than or equal to half the diameter of the pockets. The substantially axial portion has an outside diameter smaller than the outside diameter of the heel. The outside diameter of the substantially axial portion is somewhere between the pitch circle diameter of the cage reduced by half the radial thickness of the heel and the pitch circle diameter of the cage increased by half the radial thickness of the heel.

What the "pitch circle diameter of the cage" means is the diameter of the imaginary circle passing through the centers of the imaginary spheres that define the pockets. The pitch circle diameter of the cage is substantially equal to the pitch circle diameter of the rolling bearing, that is to say the diameter of the imaginary circle joining the centers of the balls.

The substantially axial portion of the cage is thus lightened, its radial thickness being reduced in comparison with that of the heel, thus leading to a reduction in the cost of the raw material of the cage, in the mass and in the inertia of the cage. Because the substantially axial portion is of a significant length, the amount of lightening is great. Thanks to this lightening, the cage deforms to a lesser extent at high speed thus reducing cage and ball wear.

In one embodiment, the substantially axial portion has, over at least part of its length, a relief angle of less than 6°, for example of the order of 4°. This then makes the substantially axial portion produced in a molded synthetic material easier to release from the mold.

In one embodiment, the substantially axial portion extends axially over a length at least equal to 60% of the diameter of the pockets. The substantially axial portion may have an outside diameter less than or equal to 95% of the outside diameter of the heel.

Advantageously, the outside diameter of the substantially axial portion is somewhere between the pitch circle diameter of the cage reduced by one third of the radial thickness of the heel and the pitch circle diameter of the cage increased by one third of the radial thickness of the heel.

In one embodiment, the cage comprises a connection between the heel and the radial portion. The connection extends axially over a length shorter than that of the axial portion. This then gives the axial portion great radial rigidity. The connection may extend over a length shorter than one third of the length of the axial portion. The substantially axial portion and the connection may extend axially over at least half the diameter of the pockets.

Advantageously, openings are formed in the heel, the openings opening onto at least two faces of the heel. The openings may be positioned angularly at equal distances between two pockets. This then significantly lightens the heel.

Advantageously, hollow regions are formed from the external face of the axial portion. The hollow regions may be positioned angularly at equal distances between two pockets. This then lightens the axial portion hence saving material and reducing the speed-induced deformation.

In one embodiment, the openings and the hollow regions intercommunicate.

In one embodiment, the substantially axial portion comprises a plurality of inter-pocket protrusions. A protrusion comprises two branches defining the pockets and connected to the heel, a rib connecting the branches some distance from the heel and from the free ends of the branches, and a partition positioned between the branches, the rib and the heel. The partition may have a radial thickness smaller than the radial thickness of the branches.

In one embodiment, the cage comprises glass-fiber filled polyamide.

In one embodiment, the cage comprises polyether-etherketone.

The invention also relates to a rolling bearing assembly comprising rolling elements positioned between two raceways and mounted in the pockets of a cage. The cage comprises an annular heel and a substantially axial portion provided with claws defining said pockets and connected to the heel. The substantially axial portion extends axially over part of the length of the rolling elements. The substantially axial portion has an outside diameter smaller than the outside diameter of the heel. The outside diameter of the substantially axial portion is somewhere between the pitch circle diameter of the cage reduced by half the radial thickness of the heel and the pitch circle diameter of the cage increased by half the radial thickness of the heel.

Around the edges of the pocket an axial thickness identical to that of the inside of the pocket may be preserved, thus forming a rib that provides good rigidity. The effects of reducing the mass of the cage and of increasing the space available for the grease can be enjoyed while at the same time maintaining enough rigidity that radial deformation of the cage can be reduced. The mass saving on a cage may be of the order of 20 to 30%, for example 25%, while the radial deformation may be reduced by about 30 to 40%, for example 35%. Thanks to the cage, a rolling bearing can be used at a rotational speed 17% higher than that of a rolling bearing fitted with a conventional cage, for example 700 000 ndm instead of 600 000 ndm, ndm being a speed factor derived from the product of the rotational speed in rpm multiplied by the pitch circle diameter of the rolling bearing in mm. The ndm is representative of the linear rate of travel of the balls.

The cage also makes it possible, for a given speed, to operate at higher operating temperatures than can be tolerated in the case of a conventional cage, this being because of the reduction in deformation and the increase in space available for lubricant. For example, in the case of a glass-fiber filled PA-6,6 polyamide cage, the operating temperature limit can be extended from 120° C. to 150° C. Furthermore, the reduction in the amount of material in which the cage is made has a significant effect in reducing raw material costs.

BRIEF DESCRIPTION OF THE SEVERAL VIEWS OF THE DRAWINGS

The present invention will be better understood from studying the detailed description of a number of embodiments taken by way of entirely nonlimiting examples and illustrated by the attached drawings in which.

DETAILED DESCRIPTION OF THE INVENTION

Figure 1:
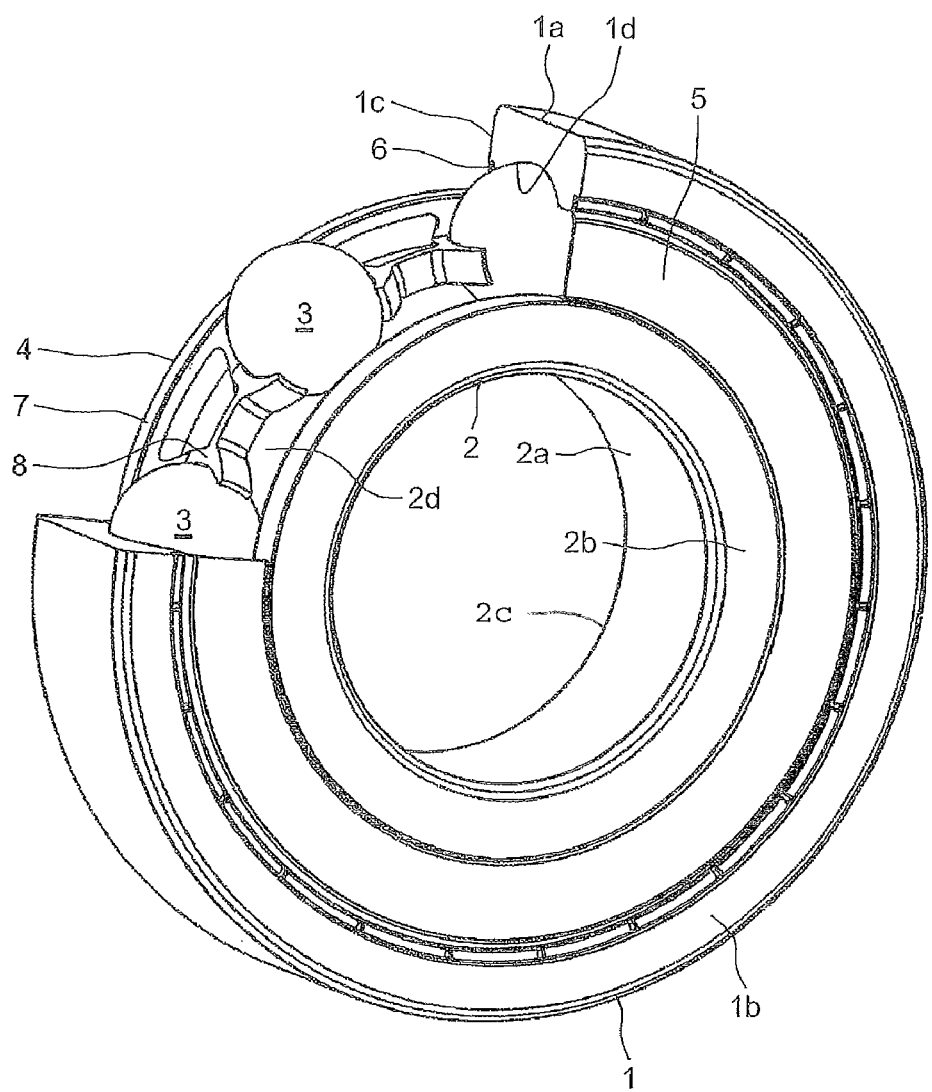
FIG. 1 is an exploded perspective view of a rolling bearing assembly according to one aspect of the invention.

As may be seen in FIG. 1, the rolling bearing assembly comprises an outer ring 1, an inner ring 2, a row of rolling elements 3, in this instance balls, a cage 4 for maintaining the circumferential spacing of the rolling elements 3, and sealing plates 5 and 6.

The outer 1 and inner 2 rings are of the deep-groove type, for example obtained by machining a portion of a tube. The outer ring 1 comprises a cylindrical axial exterior surface 1a, opposed radial frontal surfaces 1b and 1c, and a bore from which a raceway 1d is formed for the rolling elements 3. The inner ring 2 comprises a cylindrical bore 2a, two opposed radial frontal surfaces 2b and 2c and an exterior surface from which a raceway 2d is formed for the rolling elements 3. The outer ring 1 is equipped with two symmetric sealing grooves into which the sealing plates 5 and 6 respectively are fitted from the same side as the radial surface 1b and from the same side as the radial surface 1c. The sealing plates 5 and 6 form a narrow passage with a cylindrical land of the inner ring 2 lying between the raceway 2d and the respective frontal radial surfaces 2b and 2c.

Figure 2:
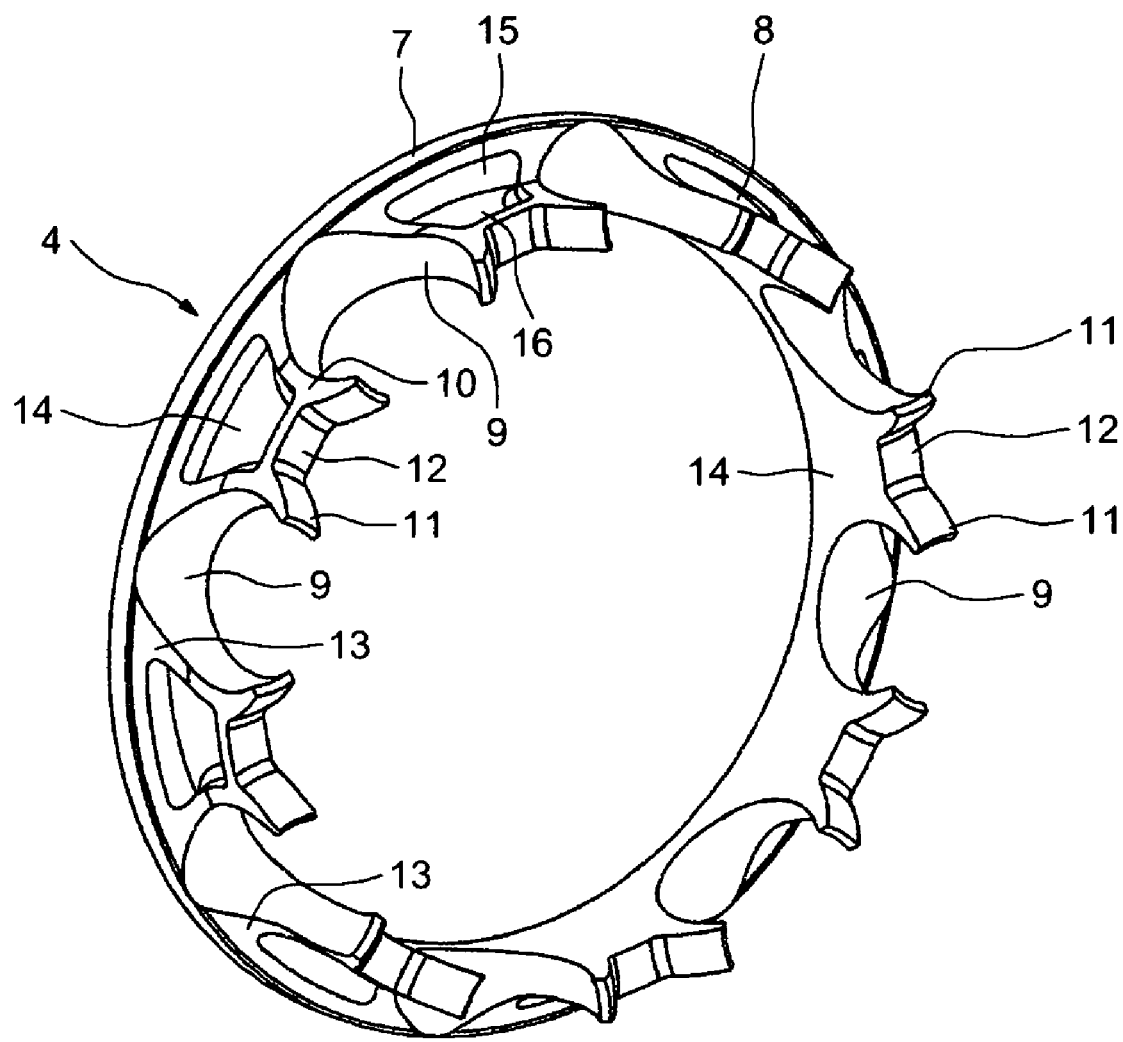
FIG. 2 is a perspective view of the cage of the rolling bearing of FIG. 1.

The cage 4 is better visible in FIG. 2 and comprises an annular heel 7 and an axial part 8 defining a plurality of pockets for the rolling elements 3. The pockets 9 are of spherical or near-spherical shape. The heel 7 has an outside diameter greater than that of the axial part 8 and the same inside diameter. However, as an alternative, it might be possible to have a heel that has an inside diameter that differs slightly from that of the axial part 8. The axial part 8 has an axial length at least equal to half the diameter of the pockets 9, so that the rolling elements 3 can be suitably retained in said pockets 9. The outside diameter of the substantially axial portion 8 lies somewhere in the range defined between the pitch circle diameter of the cage minus half the radial thickness of the heel, and the pitch circle diameter of the cage plus half the radial thickness of the heel. The pitch circle diameter of the cage is the diameter of the imaginary circle passing through the center of the imaginary spheres defining the pockets 9.

Between two adjacent pockets 9, the axial part 8 forms a protrusion comprising two arcuate branches 10, each ending in a claw 11 axially at the opposite end to the heel 7. The axial part 8 also comprises a rib 12 connecting the ends of the two branches 10 at the opposite end to the heel 7. The claws 11 extend beyond the rib 12. The branches 10, the claws 11 and the rib 12 may have the same radial thickness.

The cage 4 also has a connection 13 located at the base of each branch 10 and forming an interface between the heel 7 and the branch 10. The connection 13 in cross section has a rounded profile and has a radial thickness that decreases from the heel 7 toward the branch 10. The branches 10 form ribs offering enough surface area to form the pockets 9 that retain the rolling elements 3.

The axial part 8 also comprises a partition 14 connecting two branches 10 of two adjacent pockets 9. The partition 14 has a small radial thickness, for example less than half the radial thickness of the branches 10, and extends axially between the heel 7 and the rib 12. The partition 14 is positioned on the internal face of the axial part 8 and leaves a hollow region 16 on the external face. In other words, the hollow regions 16 extend axially between the heel 7 and the rib 12, circumferentially between two branches 10 of two adjacent pockets 9 and radially between the partition 14 and the external face of the axial part 8. As can be seen in FIG. 2, the partition 14 is delimited radially toward the inside by the cylindrical interior surface of the cage 4.

Openings 15 are also formed in the heel 7 and extend axially between the opposite face of the heel 7 to the axial part 8 and the hollow regions 16. The openings 15 and the hollow regions 16 thus intercommunicate, making the cage easier to manufacture, for example by molding. Furthermore, the presence of the openings 15 and of the hollow regions 16 encourages the flow of lubricant within the rolling bearing. The openings 15 are circumferentially delimited substantially in the region of the openings 16 and therefore between the root of each branch 10 and radially in such a way as to leave part of the heel 7 on the inside and another part of the heel 7 on the outside.

Thanks to the reduction in the outer diameter of the axial part 8 and to the presence of the openings 15 and of the hollow regions 16, the amount of material needed to form the cage 4 is markedly reduced, leading to a reduction in raw material cost and to a reduction in mass which means that the radial deformation induced by high speed rotation is reduced. Further, the shape of the axial part 8, with branches forming stiffening ribs and the partition 14 which also increases the rigidity on the side of the axial part 8 that experiences tensile axial stress as the entire axial part 8 undergoes flexural radial deformation, also means that said flexural radial deformation can be reduced, the heel 7 remaining relatively non-deformable in the radial direction as a result of its annular structure.

Figures 3, 4:
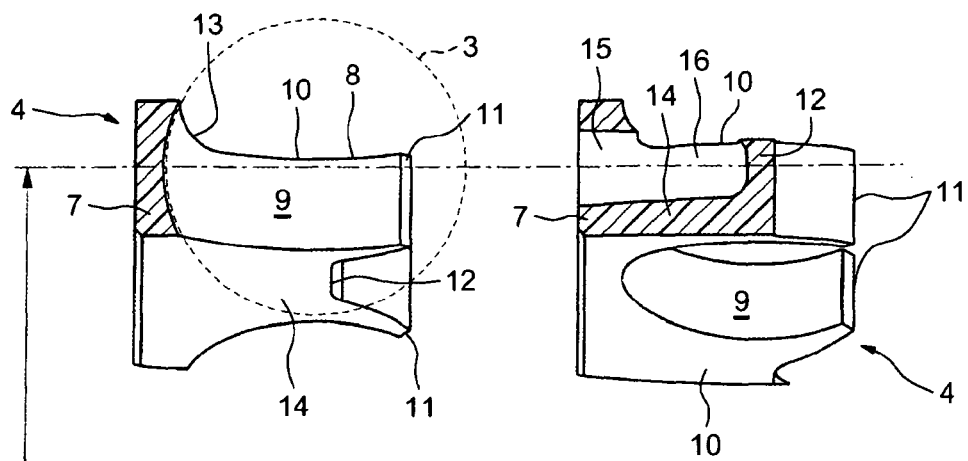
FIG. 3 is a part view in axial section through a pocket of the cage of FIG. 2.
FIG. 4 is a part view in axial section through a substantially axial portion of the cage of FIG. 2.

As can be seen in FIGS. 3 and 4, the outside diameter of the axial part 8 is slightly greater than the pitch circle diameter of the cage and remains smaller than the sum of the pitch circle diameter of the cage and half the radial thickness of the heel 7.

Figures 5, 6:
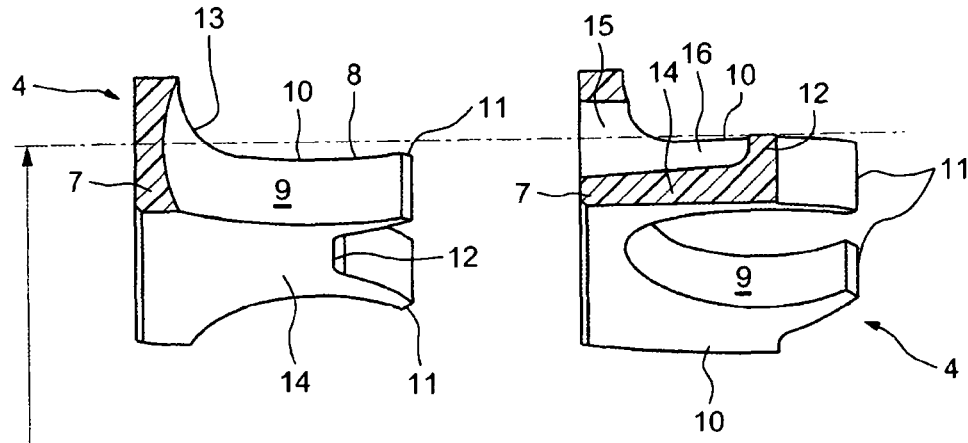
FIGS. 5 and 6 are views corresponding to FIGS. 3 and 4 of another embodiment of the cage.

In the embodiment illustrated in FIGS. 5 and 6, the outside diameter of the axial part 8 is substantially equal to the pitch circle diameter of the cage 4.

Figures 7, 8:
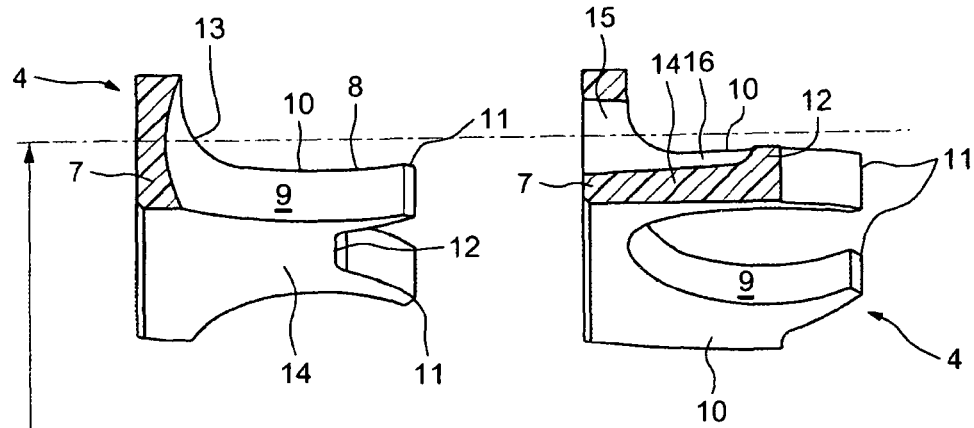
FIGS. 7 and 8 are views corresponding to FIGS. 3 and 4 of another embodiment of the cage.

In the embodiment illustrated in FIGS. 7 and 8, the outside diameter of the axial part 8 is smaller than the pitch circle diameter while at the same time remaining greater than the pitch circle diameter minus half the radial thickness of the heel 7. This embodiment offers a cage that is particularly lightweight and therefore economical. Its deformation may be slightly greater, without any particular damage being suffered, because of the great distance there is radially between the claws 11 and the bore of the outer ring of the rolling bearing. This distance may exceed the radius of the pockets.

Figure 9:
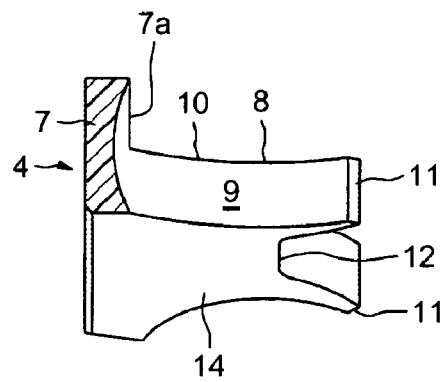
FIG. 9 is a view corresponding to FIG. 3 of another embodiment of the cage.
Figure 10:
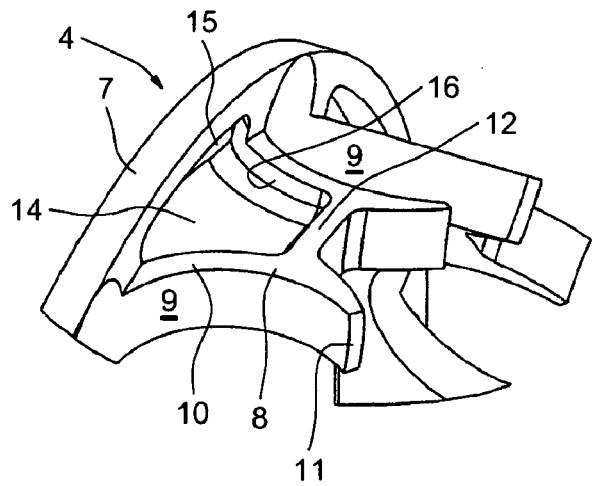
FIG. 10 is a perspective view of the cage of FIG. 9.

In the embodiment illustrated in FIGS. 9 and 10, the axial part 8 and the heel 7 are connected directly together, the heel 7 having a radial surface 7a on the same side as the axial part 8. The rounded connection 13 provided in the previous embodiment is therefore not present here.

Figure 11:
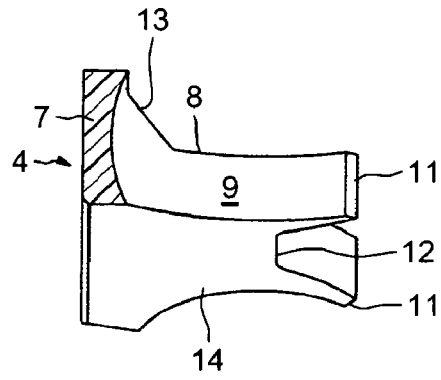
FIG. 11 is a view corresponding to FIG. 3 of another embodiment of the cage.
Figure 12:
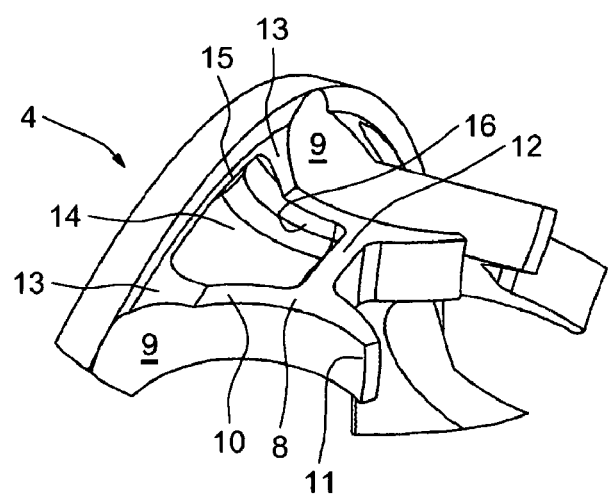
FIG. 12 is a perspective view of the cage of FIG. 11.

In the embodiment illustrated in FIGS. 11 and 12, the connection 13 is in the form of a substantially 45° chamfer of relatively short axial length, representing of the order of 15 to 25% of the length of the axial part 8. The presence of a connection increases the radial rigidity of the axial part 8, at the expense of a very slight increase in mass.

Figure 13:
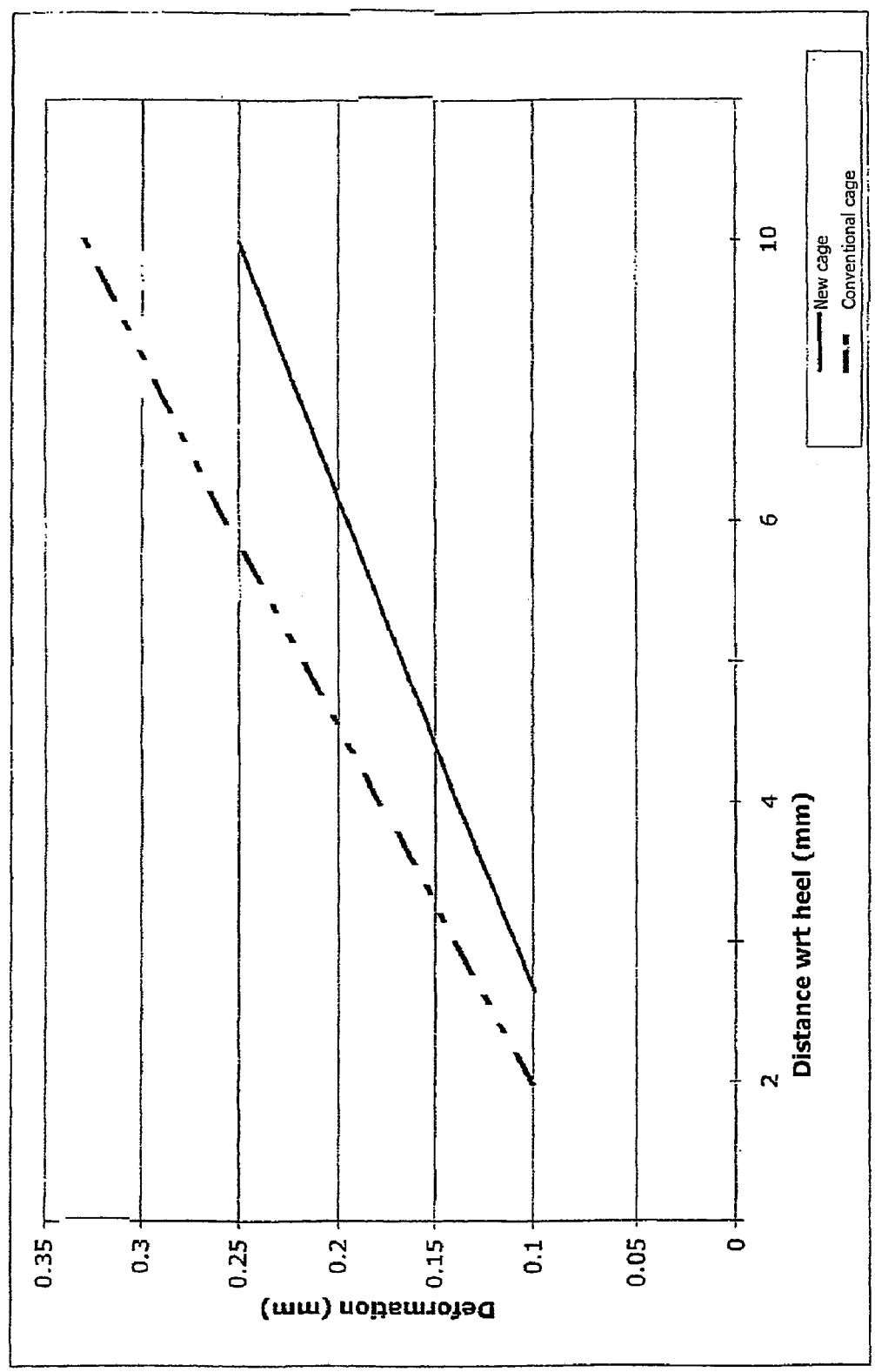
FIG. 13 is a curve showing cage deformation as a function of the distance with respect to the heel for a cage according to the invention and for a conventional cage under given operating conditions.

The curve in FIG. 13 shows, for a given operating point of a given rolling bearing, or in other words, for a particular rotational speed of a cage with a particular pitch circle diameter, the change in radial deformation of the axial part 8 of the cage 4 as a function of the distance with respect to the heel 7 of the point the deformation of which is being measured, and does so for a conventional cage and for the cage according to the invention. By way of example, it may be seen that when the cage according to the invention displays a deformation of 0.15 mm, the conventional cage is already displaying a deformation of 0.2 mm, these both being at the same distance from the heel.

Aside from the better lubrication and the reduction in the mass, inertia and amount of material used, the invention also offers a significant reduction in radial deformation and therefore an improvement in the uniformity of the film of lubricant, a reduction in frictional torque, a reduction in bearing internal heating, a reduction in cage wear and a considerable increase in bearing life. Furthermore, at maximum permissible radial deformation, a very significant increase in the rotational speed of the rolling bearing may be had. The increase in speed may be substantially equal to the square root of the reduction in deformation when switching from a conventional cage to a cage according to the invention.

The invention claimed is:

1. A cage for a ball bearing, the cage comprising:
   an annular heel having a radial thickness; and
   a substantially axial portion having claws defining pockets for balls and connected to the heel the substantially axial portion extending axially over a length greater than or equal to half the diameter of the pockets, the substantially axial portion having an outside diameter lesser than the outside diameter of the heel, the outside diameter of the substantially axial portion having a value generally between the pitch circle diameter of the cage minus half the radial thickness of the heel and the pitch circle diameter of the cage.

2. The cage as claimed in claim 1, wherein the substantially axial portion extends axially over a length at least equal to 60% of the diameter of the pockets.

3. The cage as claimed in claim 1, comprising a connection between the heel and the substantially axial portion, said connection extending axially over a length lesser than the length of the substantially axial portion.

4. The cage as claimed in claim 1, wherein the heel includes two faces and openings extending between the two faces of the heel.

5. The cage as claimed in claim 4, wherein the substantially axial portion has an external face and hollow regions formed on the external face.

6. The cage as claimed in claim 5, wherein the openings and the hollow regions intercommunicate.

7. The cage as claimed in claim 5, wherein the openings and the hollow regions are angularly positioned at generally equal distances between the pockets.

8. The cage as claimed in claim 1, wherein the substantially axial portion includes a plurality of inter-pocket protrusions, each protrusion including two branches defining the pockets and connected to the heel, a rib connecting the branches and located between the heel and free ends of the branches, and a partition having a radial thickness less than the radial thickness of the branches and positioned between the branches, the rib and the heel.

9. The cage as claimed in claim 1, wherein the heel and the axial portion are formed of at least one of glass-fiber filled polyamide and polyether-ether-ketone.

10. A rolling bearing assembly comprising:
    two raceways;
    a cage disposed between the two raceways and including an annular heel having a radial thickness and a substantially axial portion having claws defining pockets for balls and connected to the heel, the substantially axial portion extending axially over a length greater than or equal to half the diameter of the pockets, the substantially axial portion having an outside diameter lesser than the outside diameter of the heel, the outside diameter of the substantially axial portion having a value generally between the pitch circle diameter of the cage minus half the radial thickness of the heel and the pitch circle diameter of the cage; and
    balls mounted in the pockets of the cage.

11. A cage for a ball bearing, the cage comprising:
    an annular heel having a radial thickness; and
    a substantially axial portion having claws defining pockets for balls and connected to the heel the substantially axial portion extending axially over a length greater than or equal to half the diameter of the pockets, the substantially axial portion having an outside diameter lesser than the outside diameter of the heel, the outside diameter of the substantially axial portion having a value generally between the pitch circle diameter of the cage minus half the radial thickness of the heel and the pitch circle diameter of the cage plus half the radial thickness of the heel, and wherein
    the heel includes two faces and openings extending between the two faces of the heel.

12. The cage as claimed in claim 11, wherein the substantially axial portion extends axially over a length at least equal to 60% of the diameter of the pockets.

13. The cage as claimed in claim 11, comprising a connection between the heel and the substantially axial portion, said connection extending axially over a length lesser than the length of the substantially axial portion.

14. The cage as claimed in claim 11, wherein the substantially axial portion has an external face and hollow regions formed on the external face.

15. The cage as claimed in claim 14, wherein the openings and the hollow regions intercommunicate.

16. The cage as claimed in claim 14, wherein the openings and the hollow regions are angularly positioned at generally equal distances between the pockets.

17. The cage as claimed in claim 11, wherein the substantially axial portion includes a plurality of inter-pocket protrusions, each protrusion including two branches defining the pockets and connected to the heel, a rib connecting the branches and located between the heel and free ends of the branches, and a partition having a radial thickness less than the radial thickness of the branches and positioned between the branches, the rib and the heel.

18. The cage as claimed in claim 11, wherein the heel and the axial portion are formed of at least one of glass-fiber filled polyamide and polyether-ether-ketone.

* * * * *